(12) United States Patent
Tajuddin et al.

(10) Patent No.: US 11,755,612 B2
(45) Date of Patent: Sep. 12, 2023

(54) TECHNIQUES AND ARCHITECTURES FOR IMPORTATION OF LARGE DATA LOAD

(71) Applicant: Salesforce, Inc., San Francisco, CA (US)

(72) Inventors: Brian Jaffery Tajuddin, Seattle, WA (US); Samarpan Jain, Fremont, CA (US); Reuben Cornel, San Francisco, CA (US); Siddhi Mehta, Milpitas, CA (US); Brian Esserlieu, Walnut Creek, CA (US); Jan Asita Fernando, San Francisco, CA (US); Jonathan Mark Bruce, San Rafael, CA (US); Jay Hurst, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 6 days.

(21) Appl. No.: 17/164,731

(22) Filed: Feb. 1, 2021

(65) Prior Publication Data

US 2021/0311776 A1    Oct. 7, 2021

Related U.S. Application Data

(63) Continuation of application No. 15/374,787, filed on Dec. 9, 2016, now Pat. No. 10,908,947.

(51) Int. Cl.
*G06F 16/25* (2019.01)
*G06F 11/07* (2006.01)
(Continued)

(52) U.S. Cl.
CPC .......... *G06F 16/258* (2019.01); *G06F 9/4881* (2013.01); *G06F 11/0766* (2013.01); *G06F 16/2386* (2019.01)

(58) Field of Classification Search
CPC .... G06F 9/4881; G06F 9/505; G06F 16/2386; G06F 16/258; G06F 11/0766; H04L 67/1097
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

OTHER PUBLICATIONS

Final Office Action for U.S. Appl. No. 15/374,787 dated Oct. 29, 2019, 10 pages

(Continued)

*Primary Examiner* — Cheyne D Ly
(74) *Attorney, Agent, or Firm* — Kwan & Olynick LLP (57) ABSTRACT

Techniques and architectures for data ingestion in an environment having a distributed data storage system. A request to import data into the environment. The data to be imported from an external source through an application programming interface (API). The request is analyzed to determine if the request corresponds to a request to import a large data load. The data is staged if the request is for the large data load. Data management jobs are created to cause the data to be stored in one or more nodes of the distributed data storage system. The data management jobs are transmitted to corresponding nodes in the distributed data storage system. The jobs are executed asynchronously to cause the data to be stored in the nodes.

18 Claims, 5 Drawing Sheets

(51) Int. Cl.
*G06F 9/48* (2006.01)
*G06F 16/23* (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,203,945 B2 * | 4/2007 | Kravtchenko ......... G06Q 30/00 707/999.01 |
| 7,289,976 B2 | 10/2007 | Kihneman et al. |
| 7,340,411 B2 | 3/2008 | Cook |
| 7,620,655 B2 | 11/2009 | Larsson et al. |
| 8,768,967 B2 | 7/2014 | Abrams et al. |
| 9,026,499 B1 * | 5/2015 | Rajimwale ......... G06F 11/0727 707/674 |
| 9,213,709 B2 | 12/2015 | Patiejunas et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0028620 A1 * | 2/2003 | Woelfel ................ G06F 16/258 709/219 |
| 2003/0037175 A1 * | 2/2003 | Kravtchenko ......... G06Q 30/00 707/E17.005 |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2009/0313263 A1 | 12/2009 | Sato |
| 2011/0040732 A1 * | 2/2011 | Anglin .................... G06F 21/64 711/E12.001 |
| 2011/0113074 A1 * | 5/2011 | Abrams ................ G06F 16/00 707/812 |
| 2013/0282720 A1 * | 10/2013 | Baker .................. G06F 16/35 707/737 |
| 2014/0136779 A1 | 5/2014 | Guha et al. |
| 2015/0142846 A1 | 5/2015 | Levine et al. |
| 2016/0292206 A1 * | 10/2016 | Ruiz Velazquez .... G06F 16/258 |
| 2016/0358047 A1 | 12/2016 | Asahara |
| 2017/0220405 A1 * | 8/2017 | Larsen ................ G06F 11/0706 |
| 2018/0181631 A1 | 6/2018 | Wang |

OTHER PUBLICATIONS

Non-Final Office Action for U.S. Appl. No. 15/374,787 dated Apr. 3, 2020, 10 pages.

Non-Final Office Action for U.S. Appl. No. 15/374,787 dated Mar. 21, 2019, 9 pages.

(56) References Cited

OTHER PUBLICATIONS

Notice of Allowance for U.S. Appl. No. 15/374,787 dated Oct. 6, 2020, 7 pages.
Qiao et al., Gobblin: Unifying Data Ingestion for Hadoop, Proceedings of the VLDB Endowment, vol. 8, No. 12, pp. 1764-1769. (Year: 2015).

* cited by examiner

TECHNIQUES AND ARCHITECTURES FOR IMPORTATION OF LARGE DATA LOAD

CLAIM FOR PRIORITY

This application is a continuation of, and claims the benefit of, U.S. patent application Ser. No. 15/374,787 entitled "BIG OBJECT BULK DATA INGEST", filed Dec. 9, 2016, now U.S. Pat. No. 10,908,947 with an issue date of Feb. 2, 2021, the entire contents of which are incorporated herein by reference.

TECHNICAL FIELD

Embodiments relate to data importation from external sources. More particularly, embodiments relate to techniques for efficiently importing large blocks of data into a database environment from sources outside of the database environment.

BACKGROUND

When individuals/organizations have large amounts of data, it is common for the data to be stored on devices that belong to different environments. For example, an organization can build up large amounts of data over an extended period of time before deciding to switch to a cloud-based environment. This data is migrated to a cloud-based environment in which the data can be better utilized. However, migrating the data using traditional techniques involves many complexities that result in barriers to migration.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Various cloud-based environments exist in which large amounts of data can be managed. Some of these environments are multi-tenant environments in which a single instance of software can be shared by multiple tenants/organizations each having its own private data. When a tenant (or organization) migrates existing data into the environment, various tasks (e.g., checking, copying, merging, formatting) may be performed on the data. With large amounts of data this can be a complex and time-consuming operation. Importation of large amounts of data can become even more complex in environments that import data from multiple sources for multiple organizations, for example, in a multitenant environment.

It is possible, for example, for a tenant to attempt to import millions of records of structured data into a platform as a service (PaaS) that allows developers to create applications to run within the host environment. One example of a PaaS is force.com, which can create applications and interfaces that integrate with the Salesforce.com environment. Continuing with the Salesforce example, custom BigObjects are provided, which are custom objects backed by an HBase data store that will allow large scale data storage. Other configurations of object types and storage platforms can also be supported. In order to fully support data migration, the platform should provide a reliable, fast and resilient mechanism to load structured data into BigObjects on a large scale.

In the Salesforce environment, BigObjects are used, for example, for data archiving (e.g., a large amount of data stored in standard or custom objects), compliance (e.g., records retained for a long period of time to comply with regulatory requirements), analytics (e.g., analysis of historical data) and/or customer loyalty information (e.g., custom data used to refine the customer relationship).

Currently, the Salesforce platform utilizes an application program interface (API) known as the Bulk API to import data. However, the Bulk API has limitations on the amount of data that can be imported. In order to overcome these limitations, various embodiments are described herein to provide a technical solution that can operate using Bulk API semantics for uploading data, but import data into an unstructured data store such as HBase. In one embodiment, for example, a MapReduce job can be utilized to write comma separated value (CSV) data staged on a Hadoop Distributed File System (HDFS) to write the data directly to HBase. Other file formats, file systems and storage platforms can also be supported.

Figure 1:
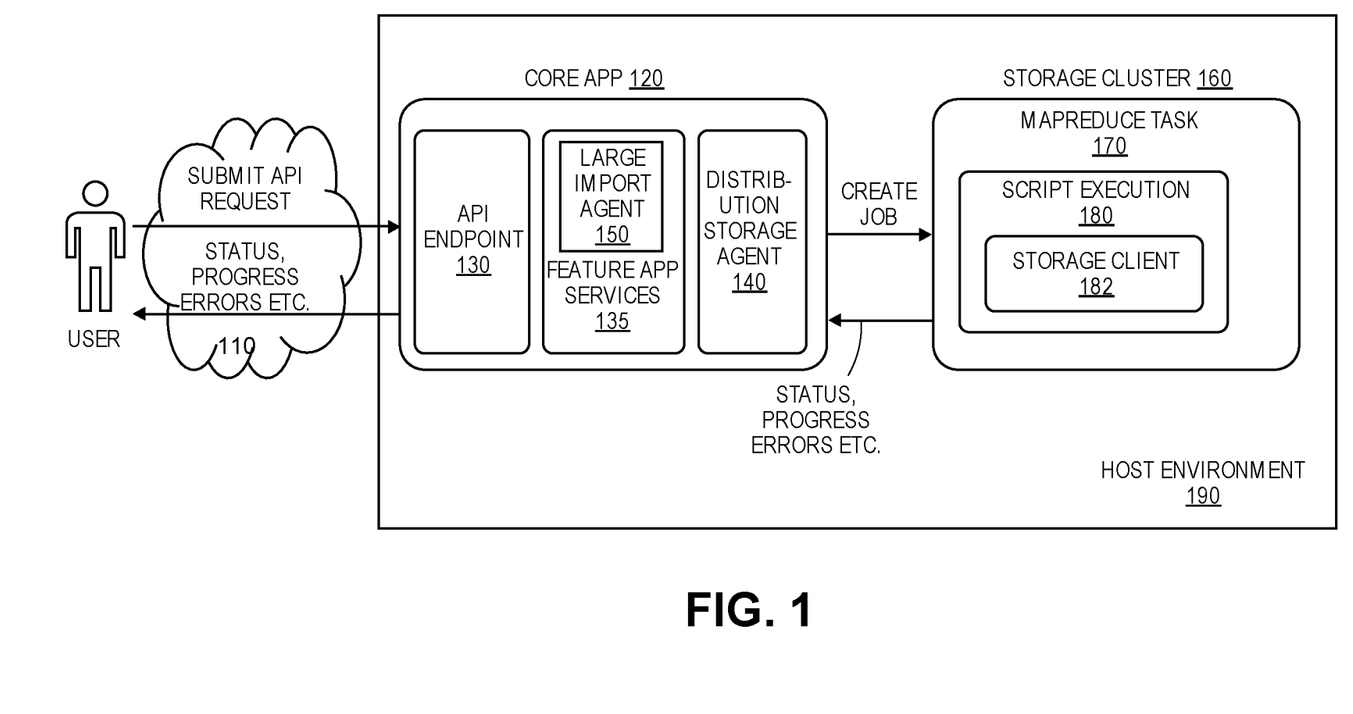
FIG. 1 is a conceptual illustration of one embodiment of an architecture to support importation of large data loads.

FIG. 1 is a conceptual illustration of one embodiment of an architecture to support importation of large data loads. The example of FIG. 1 illustrates a situation in which a user interacts with core application 120 via network 110 to request importation of large data loads to host environment 190. Host environment 190 can be, for example, an on-demand services environment (more detailed embodiments described below) providing, for example, CRM or other services with or without multitenancy.

Continuing the Salesforce example the user may use an app or other interface through, for example, a desktop computer system, mobile device, wearable device, to accesses host environment (e.g., the Salesforce platform) via network 110 (e.g., the Internet). This can be accomplished through one or more APIs and the user can receive feedback (e.g., status, errors) on their device through the APIs.

In one embodiment, core app 120 includes API endpoint 130 to provide an interface to communicate through network 110. API endpoint can manage communications with multiple users (only one illustrated in FIG. 1). Feature app services 135 operate to provide various features of core app 120. These features can include, for example, analytics, lead tracking, data management, etc. In one embodiment, core app 120 further includes distributed storage agent 140 that can operate to manage storage of large amounts of data in distributed databases.

Distributed storage agent 140 can be, for example, a Hadoop agent. Apache Hadoop is an open-source software framework for distributed storage and distributed processing of large data sets in computing clusters. Hadoop is available from the Apache Software Foundation. In alternate embodiments, distributed storage agent 140 can be, for example, HaLoop, MapRejuice, Stratosphere, Cloud MapReduce, etc. In one embodiment, no retry logic is included in the application tier. That is, all phases either succeed or fail. In one embodiment, API endpoint 130 can provide a "sanity validation" to determine whether certain syntaxes/protocols (e.g., SOQL, UDD, FLS, CRUD) are valid. In one embodiment, API endpoint 130 can provide mechanism for user to see progress and to acquire details related to data errors or other activity.

In one embodiment, API endpoint 130 that can be used to import large data loads appears the same to a user as the API utilized to import smaller data loads (even though different storage paradigms are used). In the Salesforce example, the Bulk API can be utilized to import data. In one embodiment, the format of the data to be imported is checked and, for designated types/objects, large data load techniques are utilized. Returning to the Salesforce example, if the data to be imported are in BigObjects, the techniques described herein can be utilized to import the data. Various embodiments of BigObjects are described in U.S. patent application Ser. No. 14/542,338 filed Nov. 14, 2014, entitled, "Scalable Objects for Use in an On-Demand Services Environment," by Jonathan Mark Bruce, et al., which is incorporated herein by reference.

In one embodiment, in response to initiation of data importation using BigObjects (or other designated type/object/structure), large import agent 150 to handle the importation of large data loads. Various embodiments, for the functionality of large import agent 150 are described in greater detail below.

In one embodiment, distributed storage agent 140 operates to create jobs to be sent to one or more storage clusters 160. In one embodiment, distributed storage agent 140 creates jobs (e.g., Apache Pig scripts) based on valid inputs as the result of the sanity validation discussed above. In one embodiment, in the Hadoop example, distributed storage agent 140 operates to control writing to a file in a specific location within the Hadoop Distributed File System (HDFS) and records that location in, for example, cloud environment metadata for use by other system components.

In one embodiment, storage cluster 160 provides MapReduce task 170. MapReduce task 170 is the programming and execution component of storage cluster 160 that services jobs received from core app 120. In general, MapReduce tasks include a Map functionality to provide filtering and/or sorting and a Reduce functionality that provides summary type operations. In one embodiment, the MapReduce task coordinates one or more processors to perform various tasks in parallel and manage communication there between. In alternate embodiments, other processing models can be supported.

Because storage cluster 160 is one of many storage clusters (only one illustrated in FIG. 1), a straight forward technique for managing large data loads can result in excessive traffic to and from the storage clusters. The techniques described herein provide mechanisms to reduce and/or redirect traffic to seamlessly ingest large data loads without excessive traffic loads and while providing the same user experience as ingesting smaller data loads. The traffic loads, if not managed effectively, can create other service issues within the environment that can result in degraded or negative user experiences.

In one embodiment, storage cluster 160 is implemented as a YARN node; however, in other embodiments, different technologies can be utilized to provide the functionality described herein. Apache Hadoop YARN is available from the Apache Software Foundation. In one embodiment, standard retries are initiated in response to task failures.

In one embodiment, script execution agent 180 operates to execute scripts or jobs that can be used to cause data to be stored in storage client 182. Script execution agent 180 can execute, for example, Pig scripts that cause MapReduce jobs to be executed. In one embodiment, during load and compute phases an entire task is rerun on a retry. In one embodiment, during a storage phase, custom logic can be provided to handle resuming data loads from a last known record loaded. In one embodiment, data errors during a store phase are captured and can be reported back to the user. In one embodiment, storage client retry interval is configured to allow for riding over a selected amount of expected database events that create latency.

Figure 2:
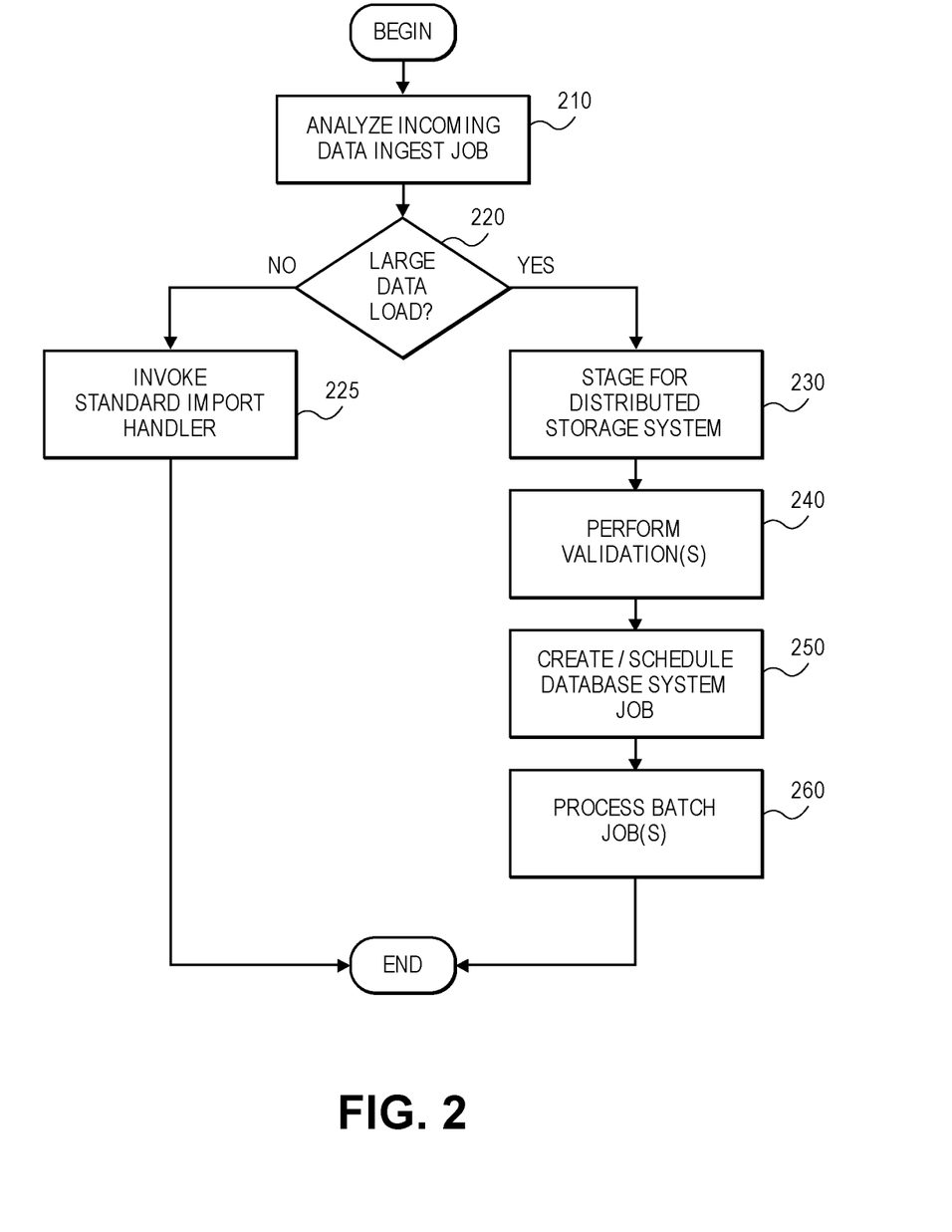
FIG. 2 is a flow diagram of a technique for importing large data loads.

FIG. 2 is a flow diagram of a technique for importing large data loads. In the example of FIG. 2, large data loads are imported into a non-relational data store (e.g., HBase) and importation of data that is not considered a large load are imported into a relational data store (e.g., Oracle 12c).

In various embodiments described herein, the interface (e.g., Salesforce Bulk API, or similar) can function to automatically detect which data store (e.g., relational vs. non-relational) to push the uploaded data to and can function to invoke the appropriate execution engine for loading data into the selected data store. Traditional techniques require a user/administrator to select the desired execution engine and/or data store by using the corresponding API. Because each API could have a different structure, this traditional technique can increase the complexity associated with data importation.

However, using the techniques described herein, logic can be included in (or triggered by) a single API (or other interface) to utilize the same semantics to load various types and/or amounts of data via a consistent interface. As described herein, agents or components of the host system work behind the scenes to inspect a target object and determine the proper data store for the object. The data can then be staged in (or for) the selected data store and the correct execution engine can be invoked to upload/import the data.

In response to receiving a request to import/ingest data, the request is analyzed, 210. One or more job characteristics can be analyzed, for example, object size, object type, what will be done with the data, data source, identity of the requestor, etc. In one embodiment, the resulting importation will be accomplished via asynchronous batch work, which allows for some level of error checking before the data is imported/ingested.

If the request is not associated with a large data load, 220, a standard import handler is invoked, 225. In one embodiment, this can be an API that has associated size (file size, number of records, length of time required) restrictions. In one embodiment, the standard import handler manages importation of data to a relational database and not data that is to be imported to a non-relational database.

In the request is associated with a large data load, 220, a large load import handler is invoked. In one embodiment, the same identifier is assigned for each attempt so that retries have the same identifier for each potential retry. In one embodiment, writing the data to the target data store is accomplished using auto-assigned unique identifiers, which is resilient to any number of retries for a Map/Reduce job (both by the system and the user). In the Salesforce example, the same Salesforce identifier can be assigned to identical records in the data to be imported. In one embodiment, this can be accomplished by splitting the data to be imported in a deterministic way, assigning block identifiers to each block, storing the assigned block identifiers in persistent storage, and reusing those assigned block identifiers on each block across any number of retries.

In one embodiment, large data loads are staged in the distributed storage system, 230. In one embodiment, HDFS is used for distributed storage; however, in other embodiments, different storage systems can be used. Other distributed storage systems that could be used include, for example, BigTable available from Google, Dynamo available from Amazon, or Azure available from Microsoft.

In one embodiment, the data is stored as a BigObject as discussed above; however, other structures and formats can also be used. In one embodiment, a metadata analysis is accomplished to determine the type of handling required for the large data load to be ingested. In one embodiment, the distributed storage system management can limit jobs based on type, which can be used, for example, to support throttling to keep a cluster from becoming overwhelmed.

One or more validation operations can be performed, 240. The validation operations can be performed on the object level and/or the field level. This validation process can avoid large error sets in the case of, for example, a formatting mismatch or similar error. The validation operations that are performed can be customized to fit the environment in which the data is being handled.

In an on-demand services environment (e.g., Salesforce), for example, tenant metadata rules that are defined in the environment relational data store can be extracted and integrated with the data (e.g., Map/Reduce) job to ensure that rules are honored. For example, a tenant's configurable data access right rules (e.g., field level security, create, read, update, delete) can be serialized and bundled with configuration information for the Map/Reduce job that loads data (e.g., into one or more BigObjects). The can be used to enforce that users can only write to objects and fields to which they have been granted access rights.

As a further example, a subset of a tenant's metadata can be serialized and bundled with configuration information for the Map/Reduce job and used in custom handler extensions to validate that the data being imported does not violate tenant data rules (e.g., data type matches, correct field length).

In one embodiment, data validation error information and access error information can be made accessible on a per-record basis via standard database queries, which can be used to allow access to an unlimited number of errors. When large amounts of data are being imported, there is the potential for a very large number (e.g., billions) of records to be validated and imported. If all of those records have errors, this should be communicated, for example, to the user/administrator responsible for the import job.

In many situations, writing errors to an error file is not scalable. Thus, in one embodiment, errors are written to the error file and a deduplication process is performed so that identical errors are only written once. This can be exposed, for example, via an API so that users can use an existing interface to navigate the error file in bounded chunks.

In one embodiment, during data validation the number of records that have data validation errors can be tracked and if the number is greater than a selected threshold and has reached a selected percentage of total records failed, the job can be terminated and/or a user can be notified to correct the errors. In various embodiments, the threshold number and/or the percentage value can be configurable. This is done to assess whether it is worth continuing the importation or if an error-filled process will waste resources.

A database system job is created/scheduled, 250. In one embodiment, a YARN resource manager is utilized to handle job scheduling and management. The jobs are then processed asynchronously, 260.

Figure 3:
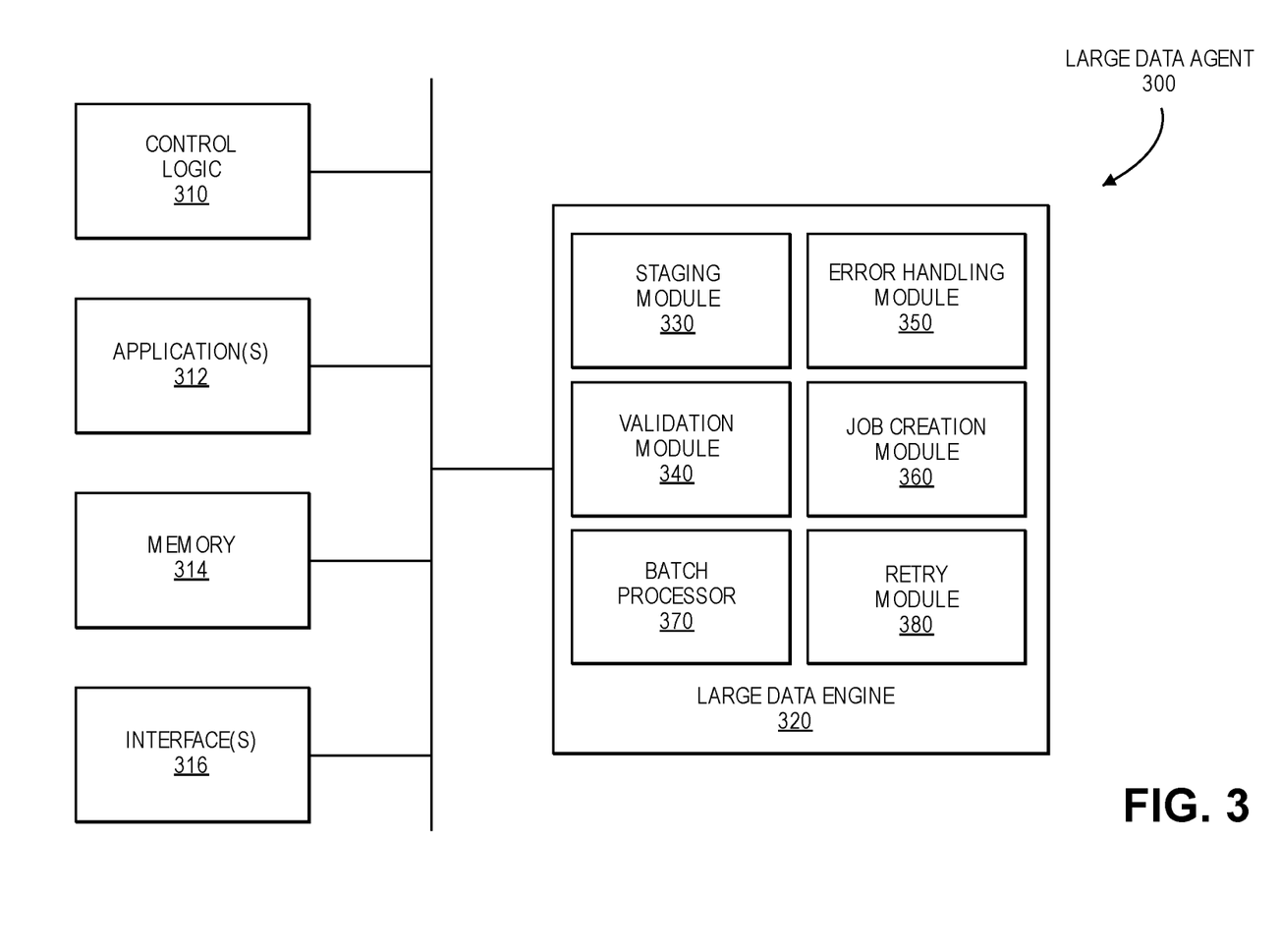
FIG. 3 is a block diagram of one embodiment of an agent to manage importation of large data loads.

FIG. 3 is a block diagram of one embodiment of an agent to manage importation of large data loads. Large data agent 300 includes control logic 310, which implements logical functional control to direct operation of large data agent 300, and/or hardware associated with directing operation of large data agent 300. Logic may be hardware logic circuits and/or software routines. In one embodiment, large data agent 300 includes one or more applications 312, which represent code sequence and/or programs that provide instructions to control logic 310. Large data agent 300 of FIG. 3 can be, for example, large import agent 150 of FIG. 1.

Large data agent 300 includes memory 314, which represents a memory device and/or access to a memory resource for storing data and/or instructions. Memory 314 may include memory local to large data agent 300, as well as, or alternatively, including memory of the host system on which large data agent 300 resides. Large data agent 300 also includes one or more interfaces 316, which represent access interfaces to/from (an input/output interface) large data agent 300 with regard to entities (electronic or human) external to large data agent 300.

Large data agent 300 also includes large data engine 320, which represents one or more functions or module that enable large data agent 300 to provide the data handling services as described above. The example of FIG. 3 provides several modules that may be included in large data engine 320; however, different and/or additional modules may also be included. Example modules that may be involved in providing the large data handling functionality include staging module 330, validation module 340, error handling module 350, job creation module 360, batch processor 370 and retry module 380. Each of these modules may further include other sub-modules to provide other functions. As used herein, a module refers to routine, a subsystem, logic circuit, microcode, etc., whether implemented in hardware, software, firmware or some combination thereof.

Staging module 330 operates to receive or analyze requests to import large data loads and causes the data to be handled by the appropriate job handler and/or API to bring the large data load into the system and stage the data. In one embodiment, the data can be staged, for example by a distributed storage agent (e.g., 140 in FIG. 1). The staging of the data to be imported can be done synchronously or asynchronously.

Validation module 240 operates to perform validation operations on some or all of the data to be imported. As discussed above, the validation can be, for example, at the object level and/or at the field level. Other types of validation can also be provided. Error handling module 350 operates to communicate the results of any errors, if any, that are identified by validation module 240. Error handling module can communicate the errors by, for example, messages on a graphical user interface, electronic mail, etc.

Job creation module 360 operates to create jobs to be performed by one or more storage clusters to ingest the large data load. In one embodiment, the jobs can be created by the distributed storage agent (e.g., 140 in FIG. 1) and send to the storage cluster (e.g., 160 in FIG. 1) to be performed by a script execution agent (e.g., 180 in FIG. 1) to cause the data to be stored (e.g., in storage client 182 of FIG. 1). In one embodiment, the jobs created by job creation module are executed by batch processor 370. Retry module 380 operates to retry jobs that were not successfully completed.

Figure 4:
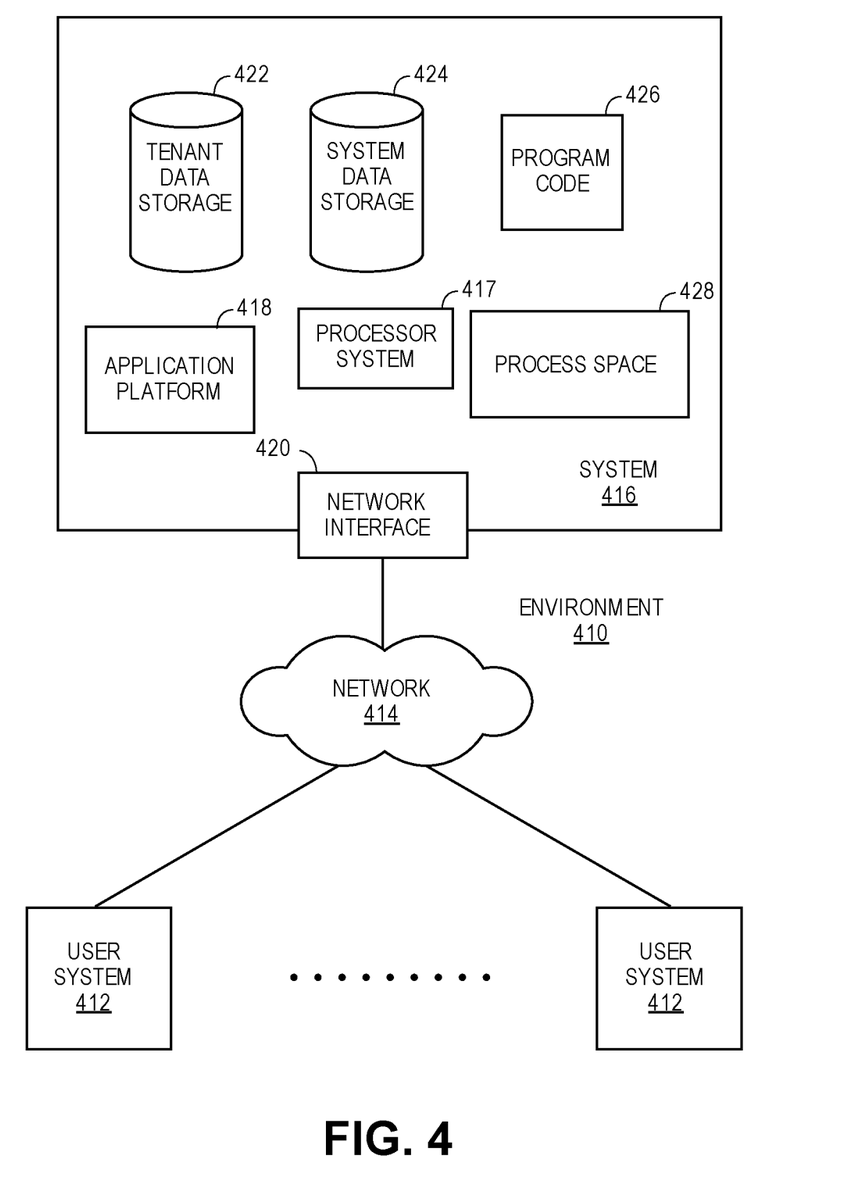
FIG. 4 illustrates a block diagram of an environment where an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Core series processor or the like. Similarly, system 416 (and additional instances of an MTS, where more than one is present) and all of their components might be operator configurable using application(s) including computer code to run using a central processing unit such as processor system 417, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
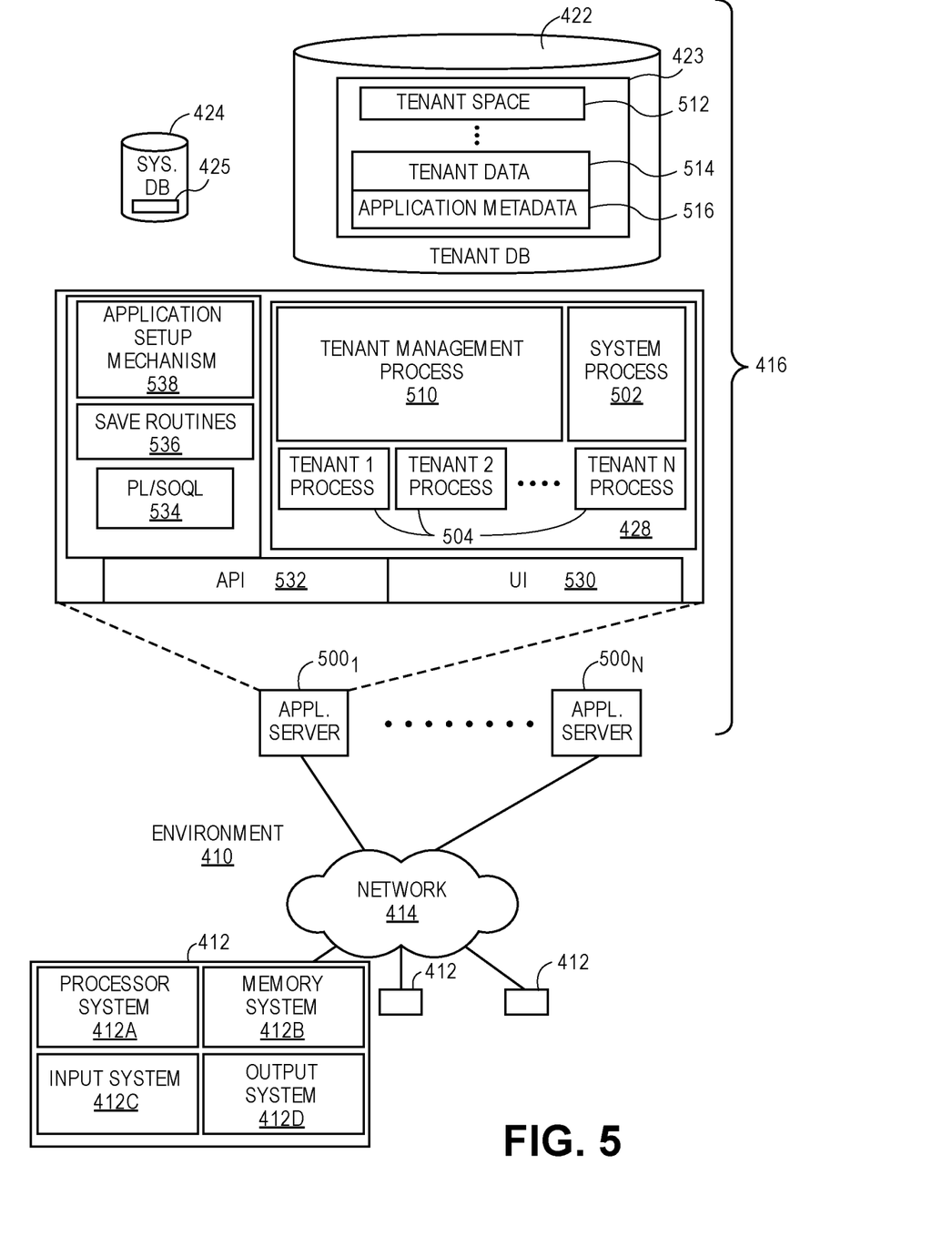
FIG. 5 illustrates a block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 BIG-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for ingesting data, the method comprising:
receiving a request to import data into a database environment;
analyzing a characteristic of importing the data to determine whether the request is associated with a first type of data load or a second type of data load;
when the request is associated with the first type of data load, invoking a first handler for the first type of data load for performing:
performing validation operations on the data;
importing records of the data that is validated into the database environment;
writing validation data to an error file, wherein the validation data is deduplicated while writing so that identical errors are written to the error file once;
during validation, tracking a number of records that have validation errors based on the validation operations; and
terminating the importing of the data and generating a user notification when the number of records having validation errors being tracked meets a threshold and has reached a selected percentage of total records failed; and
when the request is associated with a second type of data load, importing the data into the database environment using a second handler for the second type of data load without performing the validation operations on the data.

2. The method of claim 1 further comprising exposing the error file via one or more user-accessible mechanisms, wherein the error file is stored in the database environment as data accessible via a data base query.

3. The method of claim 1 further comprising exposing the error file via one or more user-accessible mechanisms wherein the validation data is configured in the error file to be displayed via a user interface to be navigated by a user.

4. The method of claim 1 wherein the validation data comprises data validation error information and access error information.

5. The method of claim 1 wherein validation is performed at a database object level or at a field level.

6. The method of claim 1, wherein:
the second handler has a size restriction on importing data, and
the first handler does not include the size restriction.

7. The method of claim 1, wherein:
the first handler imports data to a non-relational database, and
the second handler imports data to a relational database.

8. The method of claim 1 wherein:
a single interface is used to receive the request to import data, and
determines which of the first handler or the second handler to use to import the data.

9. A non-transitory computer-readable medium having stored thereon instructions for ingesting data, the instructions, when executed by one or more hardware processors, are configurable to cause the one or more hardware processors to:
receive a request to import data into a database environment;
analyze a characteristic of importing the data to determine whether the request is associated with a first type of data load or a second type of data load;
when the request is associated with the first type of data load, invoking a first handler for the first type of data load for performing:
performing validation operations on the data;
importing records of the data that is validated into the database environment;
writing validation data to an error file, wherein the validation data is deduplicated while writing so that identical errors are written to the error file once;
during validation, tracking a number of records that have validation errors based on the validation operations; and
terminating the importing of the data and generating a user notification when the number of records having validation errors being tracked meets a threshold and has reached a selected percentage of total records failed; and
when the request is associated with a second type of data load, importing the data into the database environment using a second handler for the second type of data load without performing the validation operations on the data.

10. The non-transitory computer-readable medium of claim 9 further comprising exposing the error file via one or more user-accessible mechanisms, wherein the error file is stored in the database environment as data accessible via a database query.

11. The non-transitory computer-readable medium of claim 9 further comprising exposing the error file via one or more user-accessible mechanisms wherein the validation data is configured in the error file to be displayed via a user interface to be navigated by a user.

12. The non-transitory computer-readable medium of claim 9 wherein the validation data comprises data validation error information and access error information.

13. The non-transitory computer-readable medium of claim 9 wherein validation is performed at a database object level or at a field level.

14. A system comprising:
a memory device;
at least one hardware processor coupled with the memory device, the at least one hardware processor configurable to receive a request to import data into a database environment;
analyze a characteristic of importing the data to determine whether the request is associated with a first type of data load or a second type of data load;
when the request is associated with the first type of data load, invoking a first handler for the first type of data load for performing:
   performing validation operations on the data;
   importing records of the data that is validated into the database environment;
   writing validation data to an error file, wherein the validation data is deduplicated while writing so that identical errors are written to the error file once;
   during validation, tracking a number of records that have validation errors based on the validation operations; and
   terminating the importing of the data and generating a user notification when the number of records having validation errors being tracked meets a threshold and has reached a selected percentage of total records failed; and
when the request is associated with a second type of data load, importing the data into the database environment using a second handler for the second type of data load without performing the validation operations on the data.

15. The system of claim 14 further comprising exposing the error file via one or more user-accessible mechanisms wherein the validation data is configured in the error file to be displayed via a user interface to be navigated by a user.

16. The system of claim 14 further comprising exposing the error file via one or more user-accessible mechanisms, wherein the error file is stored in the database environment as data accessible via a database query.

17. The system of claim 14 wherein the validation data comprises data validation error information and access error information.

18. The system of claim 14 wherein validation is performed at a database object level or at a field level.

* * * * *